United States Patent [19]
Bordowsky et al.

[11] 3,960,163
[45] June 1, 1976

[54] HYDRAULIC PRESSURE REGULATOR

[75] Inventors: Karl-Heinz Bordowsky, Friedrichshafen; Uwe Brendel, Kressbronn; Manfred Bucksch, Friedrichshafen, all of Germany

[73] Assignee: Zahnradfabrik Friedrichshafen AG, Friedrichshafen, Germany

[22] Filed: Feb. 14, 1975

[21] Appl. No.: 550,015

[52] U.S. Cl. ............................................ 137/56
[51] Int. Cl.² ...................................... G05D 13/38
[58] Field of Search ................................. 137/56

[56] References Cited
UNITED STATES PATENTS
2,876,784  3/1959  Adams .................................. 137/56

*Primary Examiner*—Robert G. Nilson
*Attorney, Agent, or Firm*—Karl F. Ross; Herbert Dubno

[57] ABSTRACT

A centrifugal governor on a rotating shaft has a mounting rigid with that shaft, the latter being journaled in a housing wall from which a stationary hub extends into a central bore through which a hydraulic fluid is admitted to an inlet port of a valve controlled by the governor, the outlet port of that valve communicating with a clearance provided between the hub and the shaft which opens into an outgoing channel in the hub.

7 Claims, 2 Drawing Figures

3,960,163

HYDRAULIC PRESSURE REGULATOR

FIELD OF THE INVENTION

Our present invention relates to a speed-controlled hydraulic pressure regulator of the type used, for example, to control the upshifting and downshifting of automatic speed changers in automotive transmission systems.

BACKGROUND OF THE INVENTION

Such hydraulic pressure regulators generally comprise a centrifugal governor in a mounting which is fixedly secured to a shaft whose speed is to be monitored, such as an output shaft of a planetary-gear train in a transmission system of an automotive vehicle. A valve included in that governor controls the flow of a hydraulic fluid whose pressure downstream of that valve is used as a parameter which codetermines the shifting operations together with other factors. In conventional systems of this type, e.g. as described in U.S. Pat. No. 3,095,755, the hydraulic fluid is supplied to the governor and returned from it by way of respective bores in the shaft. Such an arrangement, of course, weakens the shaft and therefore requires an enlargement of its diameter for the transmission of a given torque. Other known constructions, designed to avoid a weakening of the shaft, generally result in larger overall dimensions of the regulator assembly.

OBJECT OF THE INVENTION

The object of our present invention, therefore, is to provide an improved pressure regulator of the character set forth which is of compact construction and does not require any reduction in the effective cross-section of an associated shaft.

SUMMARY OF THE INVENTION

We realize this object, in accordance with our present invention, by the provision of a stationary structure forming a bearing for a shaft whose speed is to be translated into a variable fluid pressure, the shaft being surrounded by a hub on that structure extending into an enlarged central bore of a mounting secured to the shaft. A centrifugal governor radially displaceable in that mounting against an inwardly directed biasing force, provided for example by a coil spring, controls a valve whose inlet port communicates with a fluid source through a first passage formed by the hub and whose outlet port communicates with a receiver for the fluid, such as a pressure-responsive valve, through a second passage formed by the hub, the valve throttling the fluid flow from the inlet port to the outlet port to an extent determined by the outward displacement of the governor as is well known per se.

Advantageously, pursuant to another feature of our invention, one of the passages (e.g. the one leading to the inlet port of the valve) includes an eccentric hole in the hub whereas the other passage includes a clearance formed between the hub and the shaft. The eccentric hole may communicate with a peripheral groove of the hub from which a first conduit extends to the associated port, a second conduit connecting the other port with the central bore of the hub. Leakage of fluid from the region of the peripheral groove can be prevented by a pair of lateral sealing rings which also bear upon the peripheral wall surface of the central mounting bore to facilitate relative rotation between the hub and the mounting.

BRIEF DESCRIPTION OF THE DRAWING

The above and other features of our invention will now be described in detail with reference to the accompanying drawing in which.

SPECIFIC DESCRIPTION

Figure 2:
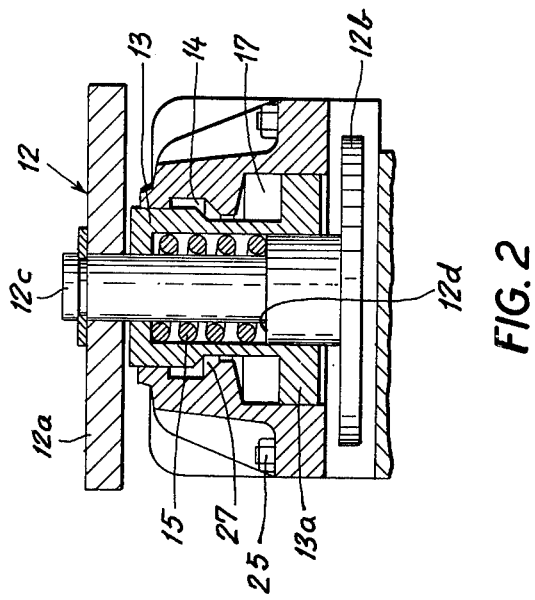
FIG. 2 is a fragmentary sectional view similar to part of FIG. 1, showing the regulator in an alternate position.
Figure 1:
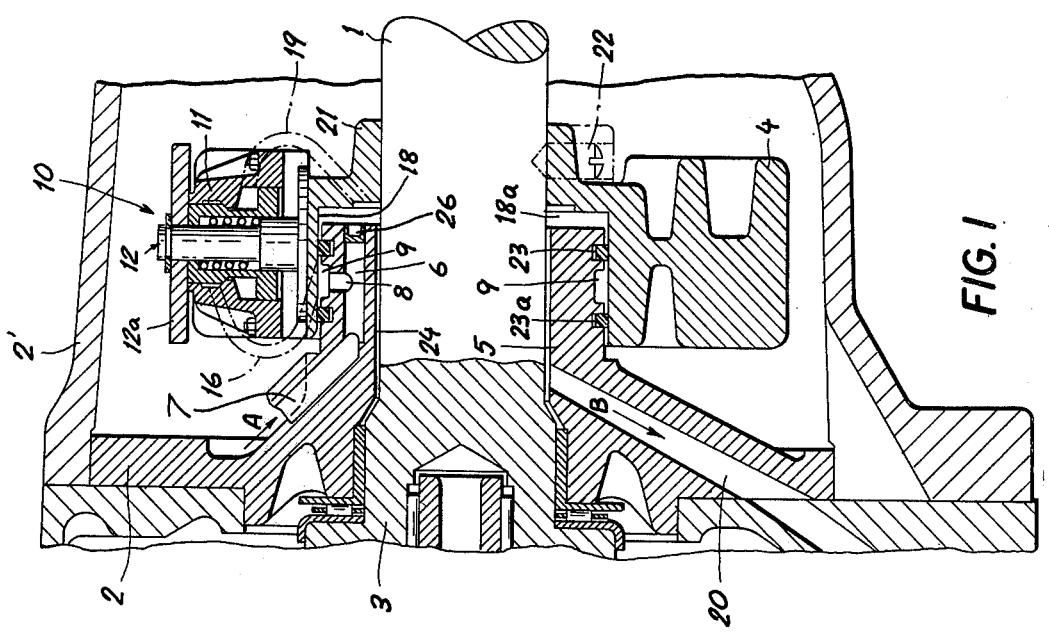
FIG. 1 is an axial sectional view of a hydraulic pressure regulator embodying our invention.

In FIG. 1 we have shown a shaft 1 which may be the output shaft of a planetary-gear train and whose rotation is to be translated into a variable pressure of a hydraulic fluid (referred to hereinafter as oil). Shaft 1 is journaled, with the aid of a bearing sleeve 3, in a transverse partition 2 of a transmission housing 2' illustrated only in part. Partition 2, acting as a supporting structure for shaft 1, has a hub 5 coaxial with that shaft which extends into a central bore 18 of a mounting member 4 forming part of a centrifugal governor 10, the diameter of this bore exceeding that of the shaft to a sufficient extent to accommodate the hub 5 with formation of an annular clearance 24 between the shaft and the inner hub surface. Member 4 has a hub 21 fixedly secured to shaft 1 by one or more screws 22. Hubs 5 and 21 are axially separated by a space 18a representing the innermost part of central bore 18, this space communicating with clearance 24.

An axially extending hole 6 in hub 5, plugged at 26, forms part of a first passage also including an extension 7 of hole 6 to which oil from a nonillustrated pump is supplied under pressure as indicated by an arrow A. A second passage, including the clearance 24 and an extension 20 thereof within hub 5, leads to a nonillustrated load such as a spring-biased valve responding to the discharge pressure of the oil flow indicated by an arrow B.

The outer surface of hub 5 is formed with a peripheral groove 9 communicating with hole 6 through a transverse bore 8. Groove 9 is flanked by a pair of sealing rings 23, 23a, e.g. of Teflon, forming a low-friction bearing for the member 4 which has a conduit 16 open toward groove 9 and a conduit 19 open to space 18a. The two conduits, indicated diagrammatically in phantom lines, actually lie in a portion of member 4 not visible in FIG. 1, in planes transverse to the axis of shaft 1.

Governor 10 has a casing 11, retained by screws 25 in a peripheral recess of the annular mounting member 4, and a weight 12 radially guided in casing 11 through the intermediary of a slider 13, the weight 12 consisting of two disks 12a and 12b interconnected by a stem 12c. A coil spring 15, surrounding the stem 12c, bears upon a shoulder 12d of that stem and upon the upper end of slider 13 so as to resist outward displacement of the weight 12 relative to the slider. Outward entrainment of slider 13 by the weight 12 is resisted by a body of oil present in a space 17 which receives a flange 13a of the slider, this space 17 communicating with an annular space 14 through a throttled passage 27 whenever the slider is moved outwardly from its quiescent position illustrated in FIG. 1 in which the inner disk 12b rests on a supporting surface of mounting member 4. Spaces 14 and 17 respectively constitute an inlet port and an outlet port for a valve formed by the slider 13 and the surrounding part of casing 11, inlet port 14 communicating with conduit 16 whereas outlet port 17 communicates with conduit 19.

It will thus be seen that oil entering the hub 5 at passage 7 flows through hole 6, bore 8, groove 9 and conduit 16 into the space 14 and thence, via the constricted passage 27, into space 17 from which it is discharged by way of conduit 19, space 18a, clearance 24 and passage 20. The output pressure B is therefore determined by the width of constriction 27 which in turn depends on the centrifugal force acting upon the weight 12. Sealing ring 23 effectively separates the two branches of the flow path from each other.

On standstill, the oil pressure in space 17 retracts the slider 13 and the weight 12 radially inwardly until the passage 27 is almost or completely closed (depending upon the angular position of the governor). In principle, the illustrated arrangement could be reversed by letting the oil enter the regulator at 20 and leave it at 7. In that instance, however, the centrifugal force acting through weight 12 and spring 15 on slider 13 would have to overcome the higher supply pressure instead of the lower discharge pressure of the oil.

We claim:

1. A hydraulic pressure regulator responsive to the speed of a rotating shaft, comprising:
    a stationary structure forming a bearing for a shaft whose rotary speed is to be translated into a variable pressure of a hydraulic fluid;
    a hub on said structure surrounding said shaft;
    a mounting secured to said shaft, said mounting having a central bore with a diameter larger than that of said shaft, said hub extending into said bore;
    a centrifugal governor radially displaceable in said mounting against an inwardly directed biasing force; and
    valve means in said mounting controlled by said governor, said valve means having an inlet port communicating with a source of said fluid through a first passage formed by said hub and an outlet port communicating with a receiver for said fluid through a second passage formed by said hub, said valve means throttling the flow of said fluid from said inlet port to said outlet port to an extent determined by the outward displacement of said governor;
    one of said passages including an eccentric hole in said hub, the other of said passages including a clearance between said hub and said shaft.

2. A pressure regulator as defined in claim 1 wherein said hub has a peripheral groove communicating with said eccentric hole and a first conduit extending from said groove to one of said ports, said hub further having a second conduit extending from said central bore to the other of said ports.

3. A pressure regulator as defined in claim 2 wherein said hub is provided with a pair of sealing rings flanking said groove, said mounting being supported on said hub through said sealing rings.

4. A pressure regulator as defined in claim 2 wherein said hub has an end spaced from the bottom of said central groove, said second conduit terminating at said bottom.

5. A pressure regulator as defined in claim 2 wherein said first and second conduits respectively extend to said inlet port and said outlet port.

6. A pressure regulator as defined in claim 1 wherein said governor comprises a casing rigid with said mounting, a radially movable slider in said casing, a weight guided by said slider for radially outward displacement by a centrifugal force, and spring means resisting relative radial motion of said slider and said weight, said slider and said casing forming part of said velve means.

7. A pressure regulator as defined in claim 6 wherein said weight has a stem surrounded by said slider, said spring means being a coil spring interposed between said slider and said stem.

* * * * *